United States Patent [19]

Kittag

[11] 4,175,840
[45] Nov. 27, 1979

[54] MOTION PICTURE CAMERA WITH MULTIPLE EXPOSURE

[75] Inventor: Gerd Kittag, Vienna, Austria

[73] Assignees: Karl Vockenhuber; Raimund Hauser, both of Vienna, Austria

[21] Appl. No.: 906,862

[22] Filed: May 17, 1978

[30] Foreign Application Priority Data

May 18, 1977 [AT] Austria .................. 3572/77

[51] Int. Cl.$^2$ .............................................. A03B 7/08
[52] U.S. Cl. .............................. 352/141; 352/180; 354/209
[58] Field of Search .................. 352/141, 180, 181; 354/209

[56] References Cited

U.S. PATENT DOCUMENTS

| 4,021,826 | 5/1977 | Iwata et al. | 354/209 |
| 4,024,551 | 5/1977 | Tsujimoto | 354/209 |

*Primary Examiner*—Russell E. Adams, Jr.

*Attorney, Agent, or Firm*—Montague & Ross

[57] ABSTRACT

A transport mechanism for the advance of a motion-picture film in a camera is controlled by a photometric circuit to stop the advance of the film for a predetermined number of shutter revolutions, in the event of insufficient lighting, whereby each frame is exposed a number of times depending upon luminous intensity. The photometric circuit includes a photosensor periodically illuminated by a reflective shutter surface; the resulting voltage pulses may be fed to a pulse counter, which reactivates the transport mechanism after a manually or automatically selected number of cycles, or may charge a capacitor to trigger a threshold sensor after a sufficiently long cumulative exposure. A servomotor for the control of an iris diaphragm ahead of the shutter is controlled by the photometric circuit to reduce the incident light, under conditions of nearly sufficient illumination, to prevent overexposure of a frame due to successive exposures at full aperture.

7 Claims, 6 Drawing Figures

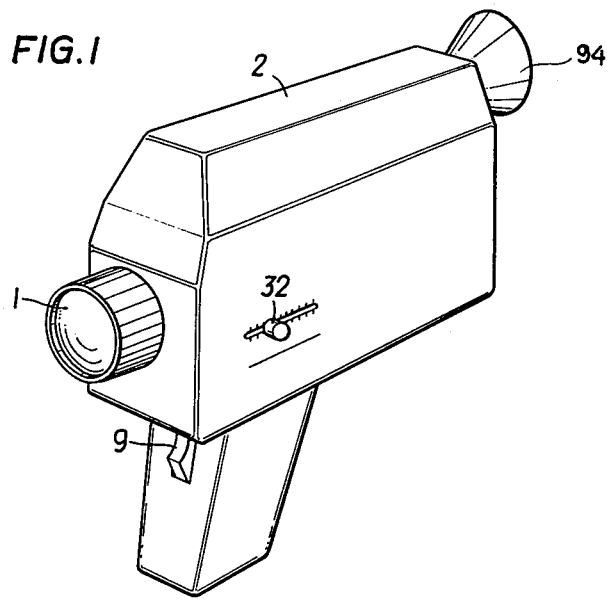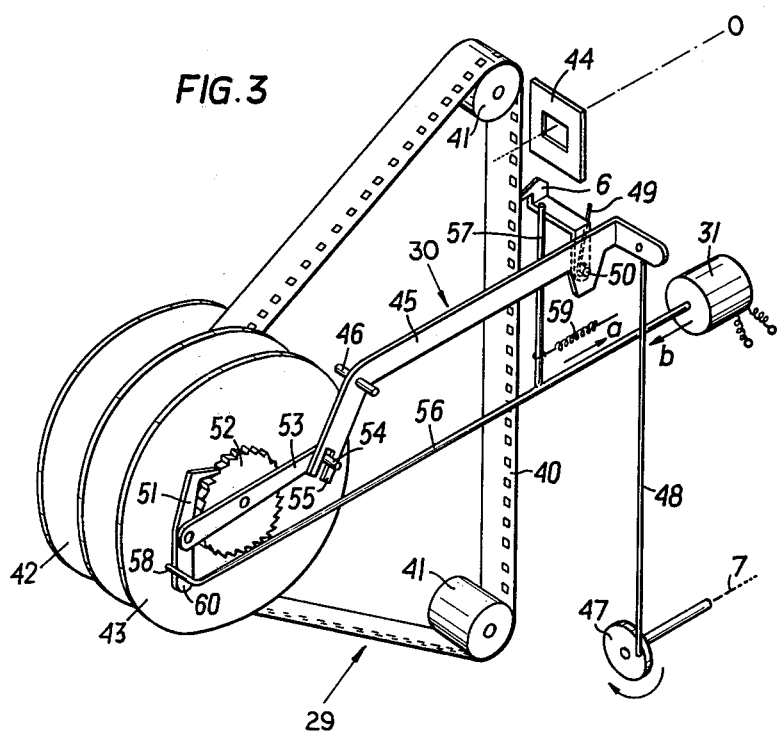

MOTION PICTURE CAMERA WITH MULTIPLE EXPOSURE

FIELD OF THE INVENTION

My present invention relates to a motion-picture camera whose picture-taking objective is in line with a rotatable shutter which turns at a predetermined speed to block the illumination of a film during frame changes.

BACKGROUND OF THE INVENTION

Normal filming, usually at a rate of 18 frames per second, can be carried out only as long as there is sufficient illumination for proper exposure within the available range of diaphragm apertures. In order to permit the use of the camera when there is insufficient illumination even at maximum aperture, or at a more restricted diaphragm setting required for a desired depth of field, it has already been proposed to extend the exposure time of a frame by temporarily deactivating the shutter; see commonly owned U.S. Pat. No. 4,003,646. According to that prior patent, the intensity of the incident light is measured by a photosensor disposed in a separate light path.

Cinematographic cameras are known in which a photosensor, designed to control the diaphragm aperture, responds to incident light from the picture-taking objective which is reflected from the objective axis by a surface of the shutter lying in line with the image gate of the camera in the exposure-blocking position thereof. Such an arrangement has the advantage of making the amount of light reaching the photosensor exactly proportional to the intensity of the beam passing the image gate during exposure, even in the case of a varifocal objective, inasmuch as the field of view is the same in both instances. The light pulses falling upon the photosensor during successive cycles give rise to voltage pulses which must be integrated to provide a suitable control voltage; proper adjustment, therefore, necessitates a constant shutter speed. Such a system, accordingly, would be ineffectual in the case of long-term exposures in which the shutter is arrested for longer or shorter periods.

OBJECTS OF THE INVENTION

An important object of my present invention is to provide means in such a motion-picture camera for facilitating long-term exposures under the control of a photometric device illuminated by light from the picture-taking objective.

Another object is to provide a camera of this description in which the need for intermittently arresting the shutter during long-term exposures is obviated, thereby insuring a smoother run and reducing the wear of its mechanical parts.

SUMMARY OF THE INVENTION

In accordance with my present invention, the film-transport mechanism of the camera normally synchronized with its shutter drive is temporarily deactivated, independently of that drive, by photometrically actuated control means to arrest the film and expose a given frame during a plurality of successive cycles of shutter motions, specifically revolutions. The activation of the control means may be either manual or automatic.

In contradistinction to the arrangement described in the prior U.S. Pat. No. 4,003,646, therefore, the system according to my invention lengthens the exposure time of a given film frame by unblocking the image gate more than once while the film is stationary. As the shutter continues to rotate at its normal speed, the photometric device may be periodically illuminated in the aforedescribed manner by light reflected from a shutter surface in its blocking position. The voltage pulses appearing in the output of the photosensor can then be used to measure the number of cycles during which the film is to be immobilized, either with the aid of a pulse counter or by accumulating the voltage pulses in an integrator triggering a threshold circuit. In the latter instance, since the pulse amplitude varies with the luminous intensity, the system adapts itself automatically to different lighting conditions.

Since the total time of illumination of an arrested film frame will always be a whole number of normal exposure periods, that time can be varied only in steps. Particularly in situations in which the illumination is nearly sufficient for normal operation, requiring only a small number of iterative exposures, the increment in exposure time due to an additional cycle (e.g. a jump from two to three cycles) may be too large for optimum exposure. It may therefore be desirable, pursuant to another feature of my invention, to make these iterative exposures at less than full diaphragm aperture by overriding the diaphragm-setting action of the photosensor normally holding the diaphragm in its wide-open position under these conditions. The overriding means may be manually or automatically controlled, preferably the latter.

The normally existing synchronization between the shutter drive and the film transport can be brought about by a mechanical coupling, the system then comprising a single motor permanently connected with the shutter. Alternatively, two separate motors could be used for the shutter and the film transport, these motors being electrically synchronized during normal operation.

BRIEF DESCRIPTION OF THE DRAWING

The above and other features of my invention will now be described in detail with reference to the accompanying drawing in which:

FIG. 1 is a perspective view of a motion-picture camera embodying my invention;

FIG. 3 is a perspective view of a mechanism for decoupling the film transport from the shutter drive in the camera of FIG. 1;

SPECIFIC DESCRIPTION

Figure 2:
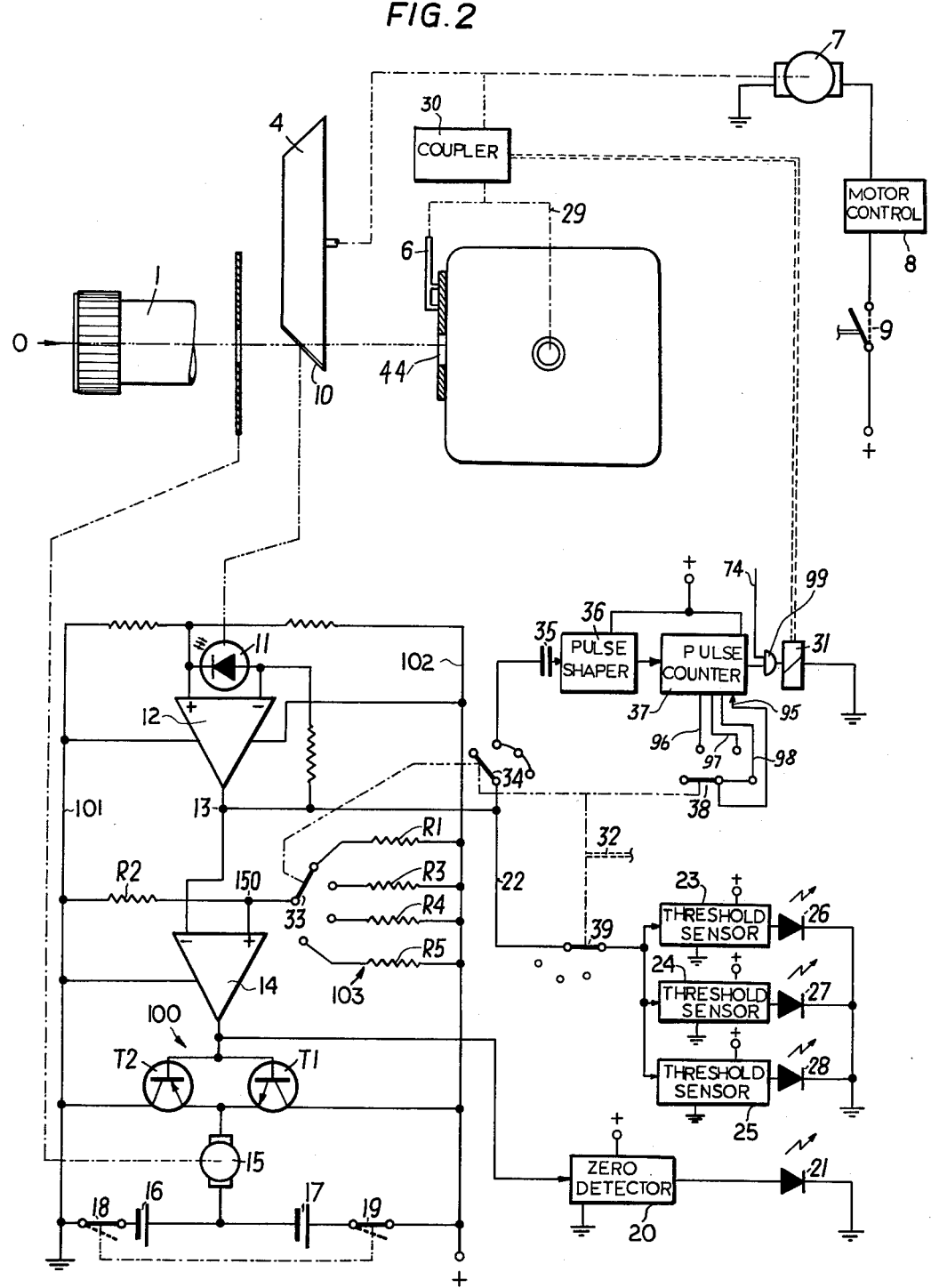
FIG. 2 is a circuit diagram of a system for operating the camera of FIG. 1 with long-term exposure according to one embodiment of my invention.

In FIG. 1 I have shown the exterior of a hand-held cinematographic camera having a picture-taking objective 1 mounted on a housing 2, a handgrip on the camera carrying a trigger 9 used for starting and stopping a filming operation. A handle 32 serves for switching from normal operation to long-term exposure as more fully described hereinafter. There is also shown an eyecup 94 for the observation of a viewfinder.

FIG. 2 shows the objective 1 in line with an iris diaphragm 3 and a rotary shutter 4 (see also FIG. 4) which has a beveled peripheral surface 10 of reflective character periodically interposable between the diaphragm aperture and a light gate 44 centered on the optical axis 0 of the objective. A cassette 5 is provided with the usual means, shown in FIG. 3, for guiding a film 40 past the image gate, these means including a supply reel 42, a takeup reel 43 coaxial therewith, and several deflecting rollers 41. A transport mechanism 29, indicated only diagrammatically in FIG. 2, serves for the intermittent advance of the film 40 with the aid of a reciprocating pull-down claw 6 and a stepping pawl 51 coacting with a ratchet wheel 52 which is coupled with the takeup reel 43 through a nonillustrated friction clutch.

Shutter 4 is driven by an electric motor 7 that is energized, upon closure of trigger switch 9, by way of a speed-stabilizing control circuit 8 from a power supply here shown as a pair of batteries 16, 17 which may be accommodated in the handgrip of the camera body 2 (FIG. 1). Transport mechanism 29 is actuated by the motor 7 through a coupling device 30 controlled by a solenoid 31.

As illustrated in FIG. 3, coupling device 30 comprises a crank disk 47 which is driven by motor 7 and is eccentrically linked with a rod 48 articulated to a lever 45 having a fixed fulcrum 46. Claw 6 is pivotally connected at 50 with lever 45 so as to carry out the reciprocating motion imparted to that lever by the disk 47. A rod 56 integral with the core of solenoid 31 carries an arm 57 against which the claw 6 is urged by a biasing spring 49; a restoring spring 59 engages the arm 57 to urge it in the direction of an arrow a in which the claw is held out of contact with the perforations of film 40. Rod 56 terminates in a hooked extremity 58 which coacts with the stepping pawl 51 to disengage it from the ratchet wheel 52 when the members 56 and 57 are attracted by the spring 59 in the de-energized state of solenoid 31. Pawl 51 is articulated to an end of a lever 53 which is fulcrumed on the shaft of ratchet wheel 52 and whose opposite end carries a pin 54 received in a bifurcation 55 of lever 45.

In normal operation, solenoid 31 is periodically energized via a contact brush 74 and a conductive track 71 on a disk 72 (FIG. 4) which rotates in step with shutter 4 and may in fact be constituted by the rear surface of that shutter. The stop arm 57 is then withdrawn (arrow b) for about three quarters of a cycle so that claw 6 can enter a perforation of film 40 and pull the film down by one frame. With the solenoid energized in the latter part of the upstroke of the claw, levers 45 and 53 actuate the pawl 51 (which is loaded by a nonillustrated spring) to step the ratchet wheel 52.

As shown in FIG. 2, the light rays reflected during the blocking phase from the surface 10 of shutter 4 impinge upon a photoelectric transducer 11, specifically a photodiode, connected across the inverting and noninverting inputs of an operational amplifier 12. This amplifier, together with other circuit elements, is energized by a pair of bus bars 101 and 102 from supply batteries 16, 17. The output 13 of amplifier 12 is connected to the inverting input of another operational amplifier 14 whose noninverting input receives a reference voltage from the junction 150 of two resistors R1 and R2 which constitute a voltage divider connected across bus bars 101, 102. A selector switch 33, manually settable with the aid of handle 32, lies between junction 150 and resistor R1 in the position illustrated in FIG. 2; an adjustment of this selector switch enables the replacement of resistor R1 by other resistors R3, R4, R5 of different magnitudes to vary the reference potential of junction 150. Amplifier 14 works into a control circuit 100 for changing the setting of diaphragm 3 in accordance with existing illumination, this control circuit comprising a reversible motor 15 in the diagonal of a bridge whose arms are formed by the batteries 16, 17 and by a pair of complementary transistors T1, T2. Two ganged switches 18 and 19 in series with these batteries are operable by the user to cut off the power supply. The reference-voltage generator including resistors R1–R5 has been designated 103.

The output of amplifier 14 is further connected to a zero detector 20 which energizes a signal lamp 21, such as a light-emitting diode, to indicate the balanced condition of bridge 16, 17, T1, T2 when there is sufficient light for the taking of pictures at the normal film speed. Diode 21 may emit a green light and may be inserted in the path of a viewfinder, observable through the eyecup 94 shown in FIG. 1, which recovers light rays diverted by a nonillustrated beam splitter ahead of iris diaphragm 3.

The output 13 of amplifier 12 is further connected to a lead 22 which, in the normal position of handle 32, is extended by a switch 39 to the inputs of several threshold sensors 23, 24 and 25 connected in parallel. Each of these threshold sensors lies in series with a respective light-emitting diode 26, 27, 28 which glows whenever the pulse amplitude at point 13 falls short of the respective threshold level. As long as photodiode 11 is not illuminated, its resistance is high and the potential of amplifier output 13 is low. With sufficient illumination, the voltage pulses integrated within each threshold sensor 23–25 prevent the lighting of any of the LEDs 26–28. The activation of any LED indicates to the user the need for a multiple exposure, e.g. for 10 cycles in the case of LED 26, 100 cycles in the case of LED 27 and 1000 cycles in the case of LED 28. The single LEDs shown in FIG. 2 could be replaced by linear LED arrays of different length visually indicating to the user the required exposure time. Again, as with diode 21, LEDs 26–28 may be positioned in the viewfinder path or at some convenient external location.

The user, thus alerted, will shift the handle 32 to change the position of selector switch 33 and two other switches 34 and 38 ganged therewith, at the same time displacing the switch 39 to disconnect the lead 22 from threshold sensors 23–25 and to extinguish any of the associated LEDs that may have been lit. Switch 34, in each of its off-normal positions, connects the amplifier output 13 through a capacitor 35 and a pulse shaper 36 to a stepping input of a pulse counter 37 having several stage outputs 96, 97, 98 selectively connectable by switch 38 to a resetting input 95 thereof. Pulse counter 37, in its reset state, unblocks an AND gate 99 for the passage of the pulses from brush 74 which normally energize the solenoid 31 during each shutter revolution. When the switch 34 is moved into an off-normal position, the first output pulse from amplifier 12 advances the counter 37 so that the AND gate 96 is blocked and solenoid 31 remains deactivated. Thus, the transport mechanism 29 of FIG. 3 remains inoperative and the film 40 is held stationary for a number of cycles determined by the setting of switch 38. When the counter 37 has reached the selected numerical value, it is quickly reset to zero and normal operation resumes.

Figure 2A:
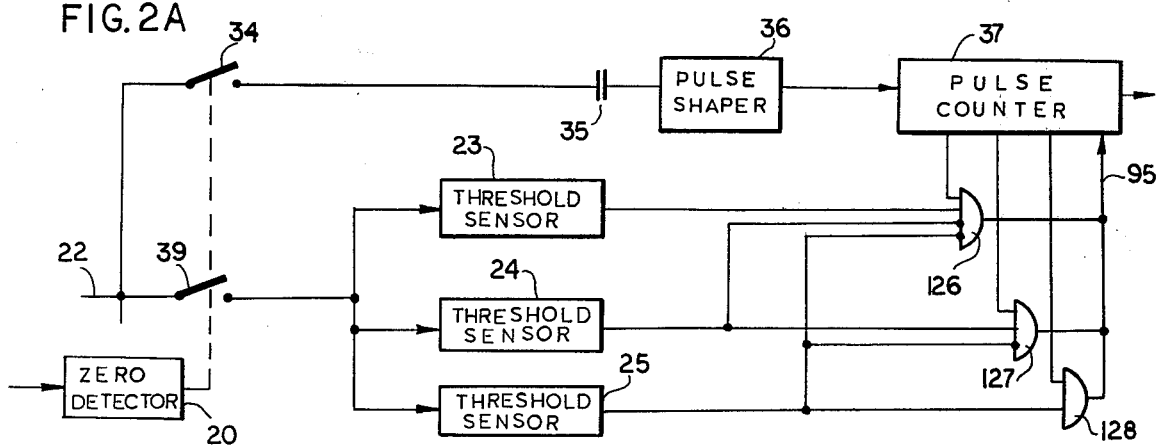
FIG. 2A shows additional circuitry usable with the system of FIG. 2 for automatic exposure control.

Whereas the pulse counter 37 of FIG. 2 is manually settable, I have shown in FIG. 2A a circuit arrangement for automatically adapting the pulse count to different lighting conditions. In this instance, switches 34 and 39 are shown as simple contacts (though they could also be electronic devices) closed whenever the zero detector 20 finds a sustained unbalance in the bridge circuit 100 of FIG. 2. Sensors 23–25 work into respective AND gates 126, 127 and 128 which connect the several stage outputs 96–98 of counter 37 to its resetting input 95 when the voltage pulses on lead 22 fall short of the respective threshold levels. Gates 126 and 127 also have inverting inputs connected to the outputs of the higher-ranking threshold sensors so that only one of the stage outputs 96–98 can be through-connected to input 95 at any time.

Figure 4:
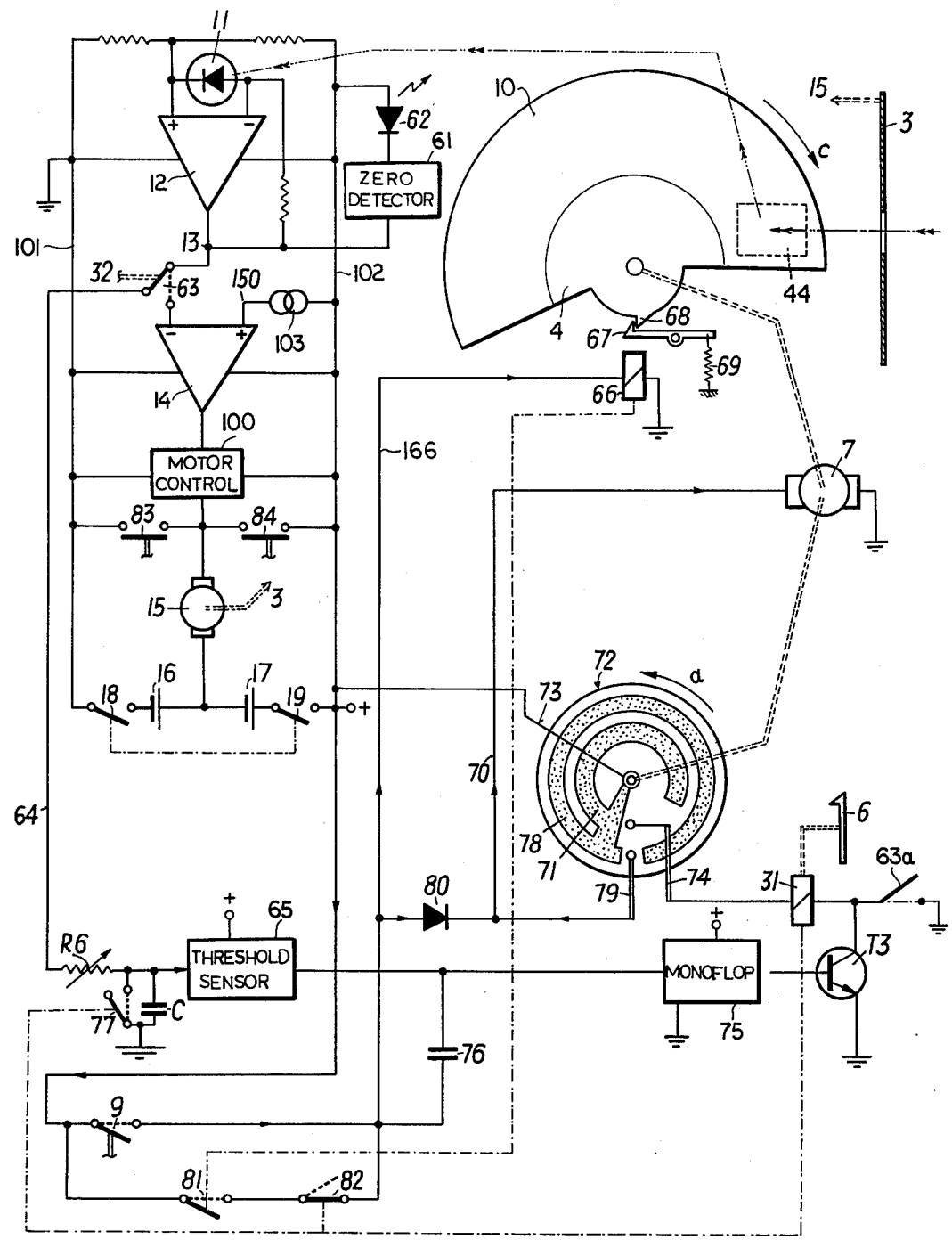
FIG. 4 is a circuit diagram generally similar to FIG. 2 but relating to a second embodiment.

In FIG. 4 I have shown the diaphragm-setting circuitry of FIG. 2 in simplified form, with motor-control circuit 100 and reference-voltage source 103 represented only schematically. The contact disk 72, assumed to rotate in a sense opposite that of the clockwise-rotating shutter (arrow c) as indicated by an arrow d, comprises a conductor track 78 which extends almost over the entire circumference of the disk and, like track 71, is permanently connected to positive bus bar 102 via a lead 73. A contact brush 79, co-operating with track 78, is connected to a lead 70 which extends to drive motor 7. A retaining pawl 67, coacting with a lug 68 of shutter 4 in the illustrated homing position thereof in which the image gate 44 is obstructed, is biased by a spring 69 into its engagement position from which it can be released by a relay 66 which has an operating lead 166 energizable from bus bar 102 upon closure of the manually actuated trigger switch 9. A shunt path across switch 9 includes two switches 81 and 82 in series, switch 81 being a make-contact armature of relay 66 whereas switch 82 is a break-contact armature controlled by solenoid 31. A further switch contact 77, ganged with armature 82, closes a discharge path across a capacitor C when the solenoid 31 is energized.

Capacitor C is chargeable from the output 13 of operational amplifier 12 via a lead 64 and a series resistor R6 whose adjustment alters the time constant of the integrating network defined by this resistor and capacitor C. This integrating network is connected to the input of a sensor 65 which trips a monoflop 75 when the capacitor charge exceeds its threshold level. Monoflop 75, when triggered, briefly cuts in a normally nonconductive NPN transistor T3 connected between solenoid 31 and ground. Normally, this solenoid is grounded through a switch 63a which is ganged with a switch 63 for manual reversal by the handle 32 whenever long-term exposure is desired. Solenoid lead 166 is further connected through an isolating diode 80 to motor lead 70 and via a capacitor 76 to the input of monoflop 75. It will be understood that this monoflop could be combined with threshold sensor 65 into a single circuit component.

In the off-normal position of switches 63 and 63a illustrated in full lines, amplifier 14 is disconnected from the output 13 of amplifier 12 and delivers to control circuit 100 a voltage designed to maintain the diaphragm 3 in its wide-open position. The control circuit, however, is shunted by a pair of manually operable switches 83, 84 which allow the diaphragm aperture to be altered and which in this instance can be used to reduce the incident illumination for an increased depth of field. Switches 83 and 84 may be associated with a further switch, not shown, which disconnects the transistors T1 and T2 (FIG. 2) from motor 15 to maintain the selected diaphragm aperture.

The pulses emitted by amplifier 12 upon illumination of photodiode 11 by light reflected from the rotating shutter, as described above, are stored on capacitor C until their cumulative value reaches the threshold of sensor 65. Until this happens, however, transport claw 6 is inoperative while the shutter 4 rotates continuously, unimpeded by detent 67 as long as the relay 66 is energized by the closure of trigger switch 9. Contacts 71, 74 and transistor T3 constitute, in effect, an AND gate equivalent to gate 99 of FIG. 2 inasmuch as solenoid 31 can operate only when the transistor conducts while the brush 74 engages the track 71. At the end of the cycle during which a final pulse from amplifier output 13 has built up the charge on capacitor C to the threshold level of sensor 65, solenoid 31 reactivates the transport mechanism 29 (FIG. 3) and also discharges the capacitor C via switch 77. A new frame can then be exposed for a number of cycles again determined by the charging rate of capacitor C.

If the user releases the trigger 9 during a cycle, the holding contact 81 of relay 66 keeps the latter energized until the operation of solenoid 31 opens the switch 82. Detent 67 then arrests the shutter 4 and, with it, the contact disk 72 in the illustrated home position.

The presence of capacitor 76 insures that solenoid 31 is actuated at the beginning of any picture-taking operation, thanks to a pulse applied to monoflop 75 through that capacitor upon the closure of trigger switch 9.

In FIG. 4 I have also shown a zero detector 61, connected between bus bar 102 and amplifier output 13 in series with a LED 62, which signals a condition of insufficient illumination as described with reference to detector 20 and diode 21 of FIG. 2.

Figure 5:
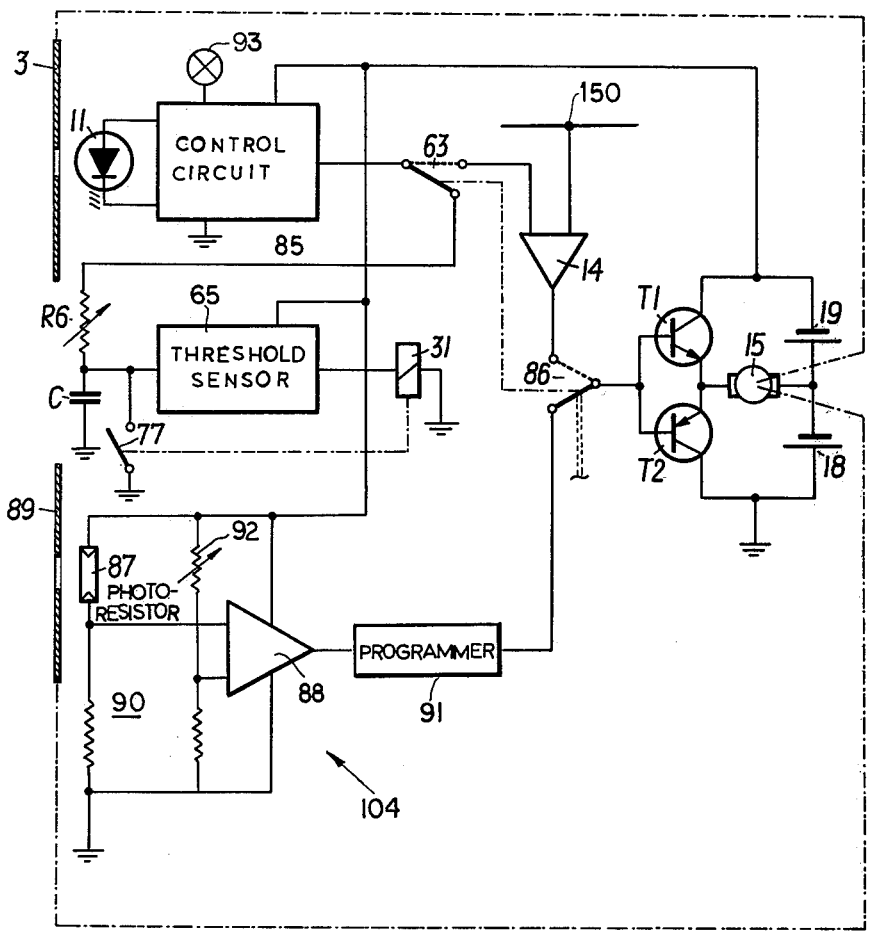
FIG. 5 is a further circuit diagram illustrating additional features.

In FIG. 5, in which the operational amplifier 12 and associated elements such as reference-voltage source 103 have been symbolically represented by a control circuit 85, the input of diaphragm-setting circuit 100 (i.e. a common base lead of transistors T1 and T2) is alternately connectable to the output of operational amplifier 14 and to an overriding circuit 104 by a handle-operated switch 86 ganged with switch 63. Circuit 85 is shown provided with a signal lamp 93 designed to indicate proper illumination, in a manner analogous to that of LED 62 in FIG. 4. The overriding circuit 104 comprises an ancillary iris diaphragm 89 which is settable by motor 15 conjointly with main diaphragm 3 to illuminate a photoresistor 87 with light whose intensity is substantially proportional to that of the beam traversing the objective 1 (FIGS. 1 and 2). Photoresistor 87 forms part of a resistive bridge circuit 90 one of whose arms is constituted by a potentiometer 92 adjustable for calibration purposes. An operational amplifier 88, acting as a comparator, is connected across the output diagonal of bridge 90 and works into a programmer 91 whose output extends to one of the bank contacts of switch 86. Programmer 91 emits a predetermined voltage, designed to hold the diaphragms 3 and 89 in their wide-open position, when ambient illumination is low and bridge arm 87 has a high resistance. When that resistance decreases to a value indicative of a degree of illumination calling for only a small number of exposures of a given frame, programmer 91 changes its output to set the diaphragm 3 at a more restricted aperture consistent with a whole number of exposures, as discussed above. In a limiting case, in which the light is barely insufficient for a normal single-cycle exposure, the diaphragm aperture will be constricted to allow proper illumination of the film in two consecutive cycles.

The photodetector 11 is preferably a silicon diode which has a substantially linear response characteristic and yields useful output voltages even at low illumination. The diaphragm-adjusting motor 15 may be an unbiased galvanometer, as shown in prior U.S. Pat. No. 4,003,646.

Instead of a complete decoupling of the takeup reel 43 during repetitive exposures, as described with reference to FIG. 3, the reel shaft and the ratchet wheel 52 could be interconnected at such a time by a step-down gearing as known per se from U.S. Pat. No. 3,635,549, for example. A stepless transmission could also be used for this purpose. The reciprocation of the claw 6, however, continues in all instances at its normal rate.

The contact disk 72, shown in FIG. 4, can be eliminated or simplified if the output pulses of operational amplifier 12 are used for the energization of a stepping motor driving the transport claw 6. It is also possible to make the drive motor 7 reversible and to provide its rotor shaft with a one-way clutch which advances the film only with one direction of rotation whereas a two-way transmission including a differential or planetary gear train translates either direction of rotation into a unidirectional rotation of the shutter. The switchover to long-term exposures requires in that case merely a change of direction by a reversing switch in the energizing circuit of the motor, coupled with handle 32.

The reflective surface 10 of shutter 4 need not be beveled, as shown, but could be perpendicular to the shutter axis if the latter is inclined with reference to the optical axis 0.

I claim:

1. In a motion-picture camera provided with an objective for the illumination of successive frames of a film, a movable shutter in line with said objective, drive means for moving said shutter whereby the light path from said objective to the film is periodically blocked and unblocked, and transport means normally synchronized with said drive means for advancing the film by one frame in a blocking position of the shutter, the combination therewith of:

photosensing means for measuring the intensity of incident light; and control means responsive to said photosensing means for temporarily deactivating said transport means independently of said drive means in the presence of less than a predetermined level of illumination to arrest the film and expose a given frame during a plurality of successive shutter movements.

2. The combination defined in claim 1 wherein said photosensing means is positioned for periodic illumination by a reflecting surface of the moving shutter.

3. The combination defined in claim 2 wherein said control means includes a generator of electrical pulses triggerable by said photosensing means, a pulse counter connected to said generator and operatively coupled with said transport means for maintaining same inactive over a preset number of pulse cycles, and switchover means for varying said preset number according to the intensity of incident light.

4. The combination defined in claim 3 wherein said switchover means comprises a manual selector, the camera being further provided with signaling means controlled by said photosensing means for indicating said intensity.

5. The combination defined in claim 3 wherein said switchover means is responsive to said photosensitive means for automatically varying said preset number.

6. The combination defined in claim 1 or 2 wherein said control means comprises a capacitor chargeable at a rate substantially proportional to the intensity of incident light, and threshold means connected to said capacitor for reactivating said transport means and discharging said capacitor upon accumulation of a predetermined charge.

7. The combination defined in claim 1 or 2, further comprising a diaphragm in the path of said incident light, setting means responsive to said photosensing means for varying the diaphragm aperture to compensate for changes in illumination, and overriding means operable by said photosensing means for reducing the diaphragm aperture under lighting conditions falling slightly short of said predetermined level.

* * * * *